(12) United States Patent
Hauser et al.

(10) Patent No.: US 11,279,055 B2
(45) Date of Patent: Mar. 22, 2022

(54) DEVICE FOR RELEASING GLASSES FROM VEHICLE BODIES AND A METHOD OF RELEASING GLASSES FROM VEHICLE BODIES

(71) Applicant: Vladimir Hauser, Ceske Budejovice (CZ)

(72) Inventors: Vladimir Hauser, Ceske Budejovice (CZ); Alexander Hauser, Ceske Budejovice (CZ)

(73) Assignee: Vladimir Hauser, Ceske Budejovice (CZ)

( * ) Notice: Subject to any disclaimer, the term of this patent is extended or adjusted under 35 U.S.C. 154(b) by 261 days.

(21) Appl. No.: 16/608,832

(22) PCT Filed: Apr. 24, 2018

(86) PCT No.: PCT/CZ2018/050020
§ 371 (c)(1),
(2) Date: Oct. 27, 2019

(87) PCT Pub. No.: WO2018/196892
PCT Pub. Date: Nov. 1, 2018

(65) Prior Publication Data
US 2020/0198165 A1    Jun. 25, 2020

(30) Foreign Application Priority Data

Apr. 27, 2017 (CZ) ................................ CZ2017-232

(51) Int. Cl.
*B26D 1/547* (2006.01)
*B25B 11/00* (2006.01)
*B60S 5/00* (2006.01)

(52) U.S. Cl.
CPC ............ *B26D 1/547* (2013.01); *B25B 11/007* (2013.01); *B60S 5/00* (2013.01)

(58) Field of Classification Search
CPC .......... B26D 1/547; B25B 11/007; B60S 5/00
See application file for complete search history.

(56) References Cited

U.S. PATENT DOCUMENTS 3,824,982 A * 7/1974 Bowman .................. B26D 1/50
125/12
2016/0194175 A1* 7/2016 Davies .................. B25B 11/007
83/13

(Continued)

FOREIGN PATENT DOCUMENTS

EP        0093283 A    11/1983
EP        2191943 A     6/2010

(Continued)

*Primary Examiner* — Omar Flores Sanchez
(74) *Attorney, Agent, or Firm* — Mark M. Friedman (57) ABSTRACT

The invention discloses a device (1) for releasing glasses (2) from the bodies (3) of vehicles where the device (1) comprises a frame (4), at least one suction pad (5), one guide pulley (6) fitted with two guide grooves (7) for guiding a cutting wire (8), or two guide pulleys (6) with a common central line, and two winding pulleys (9). The winding pulleys are fitted with winding grooves (10) for winding the cutting wire (8) and a spacing element or a spacing pulley (11) keeping the cutting wire (8) at a safe distance from the suction pad (5). During releasing the glass (2) the cutting angle (α) of the cutting wire (8) does not exceed the value of 90°. Each end of the cutting wire (8) is wound onto the winding pulleys (9) due to the guide grooves (7) wherein a safe distance from the suction pad (5) is ensured to eliminate their damage.

9 Claims, 11 Drawing Sheets

(56) References Cited

U.S. PATENT DOCUMENTS

2017/0100849 A1\* 4/2017 Finck .................. B26D 5/08
2017/0266830 A1\* 9/2017 Rodger ............... B26D 7/2628
2018/0370056 A1\* 12/2018 Finck ................. B26B 27/002

FOREIGN PATENT DOCUMENTS

| EP | 2540463 | A |   | 2/2013  |         |            |
|----|---------|---|---|---------|---------|------------|
| GB | 2489835 | A |   | 10/2012 |         |            |
| GB | 2508822 | A |   | 6/2014  |         |            |
| GB | 2511108 | A |   | 8/2014  |         |            |
| GB | 2579596 | A | * | 7/2020  | ........... | B25J 9/1045 |
| GB | 2579597 | A | * | 7/2020  | .......... | B25J 11/0055 |
| JP | 2005145424 | A |   | 6/2005  |         |            |
| WO | 2004014678 | A |   | 2/2004  |         |            |
| WO | 2004103748 | A1 |   | 12/2004 |         |            |
| WO | 2006030212 | A |   | 3/2006  |         |            |
| WO | 2012072899 | A1 |   | 6/2012  |         |            |
| WO | 2016058989 | A1 |   | 4/2016  |         |            |

\* cited by examiner

DEVICE FOR RELEASING GLASSES FROM VEHICLE BODIES AND A METHOD OF RELEASING GLASSES FROM VEHICLE BODIES

FIELD OF THE INVENTION

The invention concerns a device designed for releasing glasses from vehicle bodies, in particular from the bodies of passenger cars, and a method of releasing glasses from vehicle bodies.

BACKGROUND OF THE INVENTION

When dismantling glasses from the vehicle body the following procedure is employed: bonding agent that fixes the glass is slit. The bonding agent is found in the space between the glass and the body or between the glass and the sealing material adhered to the body. The most widely used method of binding agent slitting is the use of a cutting wire that is pulled along the circumference of the glass through the binding agent layer.

The international patent application WO 2004/103748 (A1) discloses a method and a device designed for removing small-sized glasses from the bodies of vehicles. The device comprises fastening elements for fastening to the glass being removed that are fixed to a telescopic body extendible over the entire area of the small-sized glass. The fastening elements are placed on the glass surface. When the operator starts extending the telescopic body, the fastening elements become pressed into the glass frame by which the whole device gets fixed in place. Then a cutting wire is run through the binding agent and fastened to winding elements. The winding elements are arranged on the telescopic body and consist of one movable winding pulley and one immobilised winding pulley. The fastening elements are equipped with guide grooves guiding the cutting wire along the circumference of the glass to prevent its cutting into the body or glass. Among the disadvantages of this solution is the fact that this device is designed only for small, flat glasses, and if the device gets incorrectly fixed by pressing against the glass frame of the vehicle body, the glass frame can be damaged.

The patent document U.S. Pat. No. 7,618,023 (B2) discloses a device for removing glasses from vehicle bodies that includes fastening suction pads arranged on the device body. The device body is also equipped with a movable cutting wire winding pulley and an immobilised cutting wire winding pulley arranged on the device body. The circumference of the suction pads includes a guide groove for the cutting wire. Among the disadvantages of this solution is the fact that the device is not suitable for small glasses and that the device leads the cutting wire at obtuse cutting angles, which results in the inefficient cutting of the binding agent that is prone to cracking, and in some cases it also results in indents in the vehicle body caused by the cutting wire.

The British patent application GB 2 489 835 (A) discloses a device for releasing glasses from the vehicle body that is fitted with a single suction pad for the fastening of the device to the glass with an axially fixed winding pulley. The suction pad is also equipped with a handle and pulleys arranged along the circumference of the suction pad that are fitted with a guide groove for the cutting wire. The drawbacks of this arrangement include the fact that the fixed end of the cutting wire is created on the glass by mere fastening the cutting wire end to the glass, which results in the risk of cutting wire loosening and consequential damage to health or property. The device needs to be combined with another device to cover the entire circumference of the glass without the cutting wire cutting into the vehicle body, or alternatively the device must be equipped with an independent additional cutting wire guide element that is moved during the glass removing in a manner eliminating damage to the vehicle body. Moving the additional guide element extends the time of work and is uncomfortable for the operators and also requires a certain precision of handling.

The European patent application EP 2 540 463 (A1) discloses a device for releasing glasses from vehicle bodies that is equipped with a single suction pad. The suction pad includes an element that can be used as either a handle or an arm for cutting wire guiding. One end of the arm is equipped with a cutting wire winding pulley while the opposite end contains a guide pulley. The fixed end of the wire is fastened to the glass separately. The drawbacks of this solution rest in the fact that the device must be moved on the glass during binding agent cutting and that the fixed end of the cutting wire requires a suction-pad element of its own for successful fastening.

The European patent document EP 2 191 943 (B1) discloses a device equipped with a single suction pad. The suction pad comprises a swivel element that includes a cutting wire reel and two guide pulleys arranged one opposite the other at a small distance with the cutting wire running through the gap between the pulleys towards the reel. The fixed end of the wire is fastened to the suction pad under the swivel element. With gradual wire reeling, the element is swivelled in a manner preventing damage to the vehicle body due to the cutting wire cutting-in. A drawback rests in the fact that the device is not designed for small glasses of vehicles.

The purpose of the invention is to design a device and a method of releasing glasses from vehicle bodies, in particular glasses of passenger vehicles, while eliminating the drawbacks of the known solutions. Other requirements imposed on the invention are as follows: the invention should have such a size and design to make it possible to use it for a wide range of shapes and sizes of glasses, to keep a correct cutting angle of the cutting wire which would protect the cutting wire against breaking and the vehicle body against damage, and to eliminate the necessity to move the device during work on glass releasing with the device holding both ends of the cutting wire and keeping firmly attached in place over the entire period of the method application.

SUMMARY OF THE INVENTION

The set goal has been achieved by designing a device for releasing glasses from vehicle bodies based on the following invention.

The device for releasing glasses from vehicle bodies includes a frame bearing at least one suction pad arranged towards the frame for the device for detachable fastening to the glass being released. In addition, the device comprises at least one guide pulley fixed to the frame and fitted with at least one guide groove to guide the cutting wire and with at least one winding pulley fixed to the frame fitted with at least one winding groove to wind the cutting wire.

The invention is based on the fact that the device includes two winding pulleys and one guide pulley and one guide pulley fitted with two guide grooves, or two guide pulleys with one guide groove having a common central axis. In addition, the pulleys are arranged towards the frame with their central lines intersecting the apices of a triangle where the value of distances between the central lines of the winding pulleys is greater or equals the diameter of the circle circumscribed on the device suction pad projection and the value of the triangle height running from the apex through which the guiding pulley central line is running is greater or equals the diameter of the circle circumscribed on the device suction pad projection. In addition, the winding pulleys are fitted with at least one spacing element for guiding the cutting wire outside the suction pads.

Among the advantages of the device based on the invention is the fact that it is fixed on the glass only once during the whole operation of the glass release. Another advantage is that the acting forces of the cutting wire are transferred to the suction pad through the frame in a manner supporting contact pressure, which means that the suction pad is not prone to coming off due to tilting and the device is completely fixed. Preferably, each end of the cutting wire is fixed in its designated winding pulley. The triangular arrangement of the pulleys and the positioning of the guiding pulley in the main apex allow a safe cutting angle not to be exceeded during the glass cutting off and therefore the cutting wire cannot cut into the vehicle body or glass and also the cutting wire breaks are eliminated. In addition, the spacing elements preferably protect the suction pad against damage in the case of smaller-sized glasses where the ends of the cutting wire would run over the suction pad.

In the preferred embodiment of the device for releasing glasses from vehicle bodies according to this invention the spacing element for guiding the cutting wire of the winding pulley comprises a spacing pulley fitted with a guide groove and the winding pulley and the spacing pulley have a common shaft. The deployment of the spacing pulley reduces tension in the cutting wire, reduces acting friction forces and supports the resolution of forces in a manner requiring smaller pulling forces.

In a preferred embodiment of the device for releasing glasses from vehicle bodies according to the invention the winding pulleys and/or the spacing pulleys are equipped with a single-thrust bearing. The single-thrust bearing prevents the already wound up wire from unwinding.

In a preferred embodiment of the device for releasing glasses from vehicle bodies according to the invention the guide grooves and/or winding grooves are fitted on one side with a cone-shaped leading edge for the cutting wire. With the guide grooves, the cone-shaped leading edge mitigates the risk of cutting wire slipping and the winding groove supports the even distribution of the wire being wound on the winding pulley.

In a preferred embodiment of the device for releasing glasses from vehicle bodies the winding pulleys are provided with an adapter allowing a socket wrench, handle or electric motor to be fitted. An all-purpose adapter allows the winding pulleys to be powered by a variety of tools and drives.

In a preferred embodiment of the device for releasing glasses from vehicle bodies according to the invention the frame is fitted with a handle. Preferably, the handle includes an integrated pump connected to suction pads and/or a control valve connected to suction pads to control the vacuum. Such a manually operated pump or a manually operated valve that controls the device increases the precision required for placing the device on the glass.

In a preferred embodiment of the device for releasing glasses from vehicle bodies according to the invention the frame is substantially planar with top and bottom sides and the suction pads, guide pulley and spacing element are arranged at the bottom side of the frame whereas the winding pulleys with the handle are arranged at the top frame side. The arrangement of the device components increases the extent of the device maneuverability during operation, allows good guiding of the cutting wire and improves occupational safety.

The invention also includes a method of releasing glasses from vehicle bodies that is employed with the device designed according to the aforementioned invention.

The device for the implementation of the method includes at least one suction pad, a guide pulley fitted with two guide grooves for the cutting wire guiding, two winding pulleys provided with winding grooves for the cutting wire winding and a spacing element or a spacing pulley.

The invention is based on the following procedure steps:
a) fastening the device to the glass using at least one suction pad,
b) arranging the cutting wire along the circumference of the glass on the side that is opposite to the side on which the device has been fastened and pulling through the cutting wire free ends between the glass and the body to the side with the fastened device,
c) fastening the free ends of the cutting wire to the winding pulleys while respecting the sides to which the ends of the cutting wire direct; each end of the cutting wire is led around the spacing elements or in the guide grooves of the spacing pulleys and then each end of the cutting wire is led in a designated guide groove of the guide pulley at which the end of the cutting wire are crossed and the free ends of the cutting wire are fastened into the winding grooves of the winding pulleys,
d) winding the cutting wire onto the winding pulleys either successively or simultaneously until complete winding up the cutting wire onto the winding pulleys whereby the cutting wire is cutting through between the glass and the vehicle body,
e) removing the device from the released glass.

Advantages of this method rest in the fact that the method includes a single fastening of the device to the glass, that the cutting wire never exceeds the cutting angle value of 90°, that it is possible to wind the cutting wire onto both winding pulleys simultaneously and that the glass is released completely without leaving a short unreleased section.

Other advantages of the device for releasing glasses from vehicle bodies include a managed cutting angle that never exceeds the safe limit value whose exceeding would result in cutting into the vehicle body or glass or breaking the cutting wire. Another advantage is the compact design of the device that consists of one unit attached using a single suction pad, that is operable by one hand, no matter whether during fastening or removing the device. The possibility to start winding from both ends of the cutting wire, e.g. using a motor-drive or a socket wrench, without the uncontrollable unwinding of the cutting wire due to the movability of the winding pulleys in one direction only is also preferred.

EXPLANATION OF THE DRAWINGS

The present invention will be explained in detail by means of the following figures where:
FIG. 1 provides an isometric drawing of the device,
FIG. 2 provides a plan view of the device,
FIG. 3 provides a bottom view of the device,
FIG. 4a provides a side view of the device showing one guide pulley (6) that has two guide grooves (7),
FIG. 4b provides a side view of the device showing two guide pulleys (6a) and (6b), each having their own guide groove (7), FIG. 5 provides a schematic representation of the device in the first operating position, FIG. 6 provides a schematic representation of the device in the second operating position, FIG. 7 provides a schematic representation of the device in the third operating position, FIG. 8 provides a schematic representation of the device in the fourth operating position, FIG. 9 provides a schematic representation of the device in the fifth operating position, FIG. 10 provides a schematic representation of the device in the sixth operating position.

AN EXAMPLE OF THE INVENTION EMBODIMENT

It shall be understood that the specific cases of the invention embodiments described and depicted below are provided for illustration only and do not limit the invention to the examples provided here. Those skilled in the art will find or will be able to provide a greater or smaller number of equivalents to the specific embodiments of the invention disclosed here by way of routine experiment. Also such equivalents will be included in the scope of the following claims.

Figure 1:
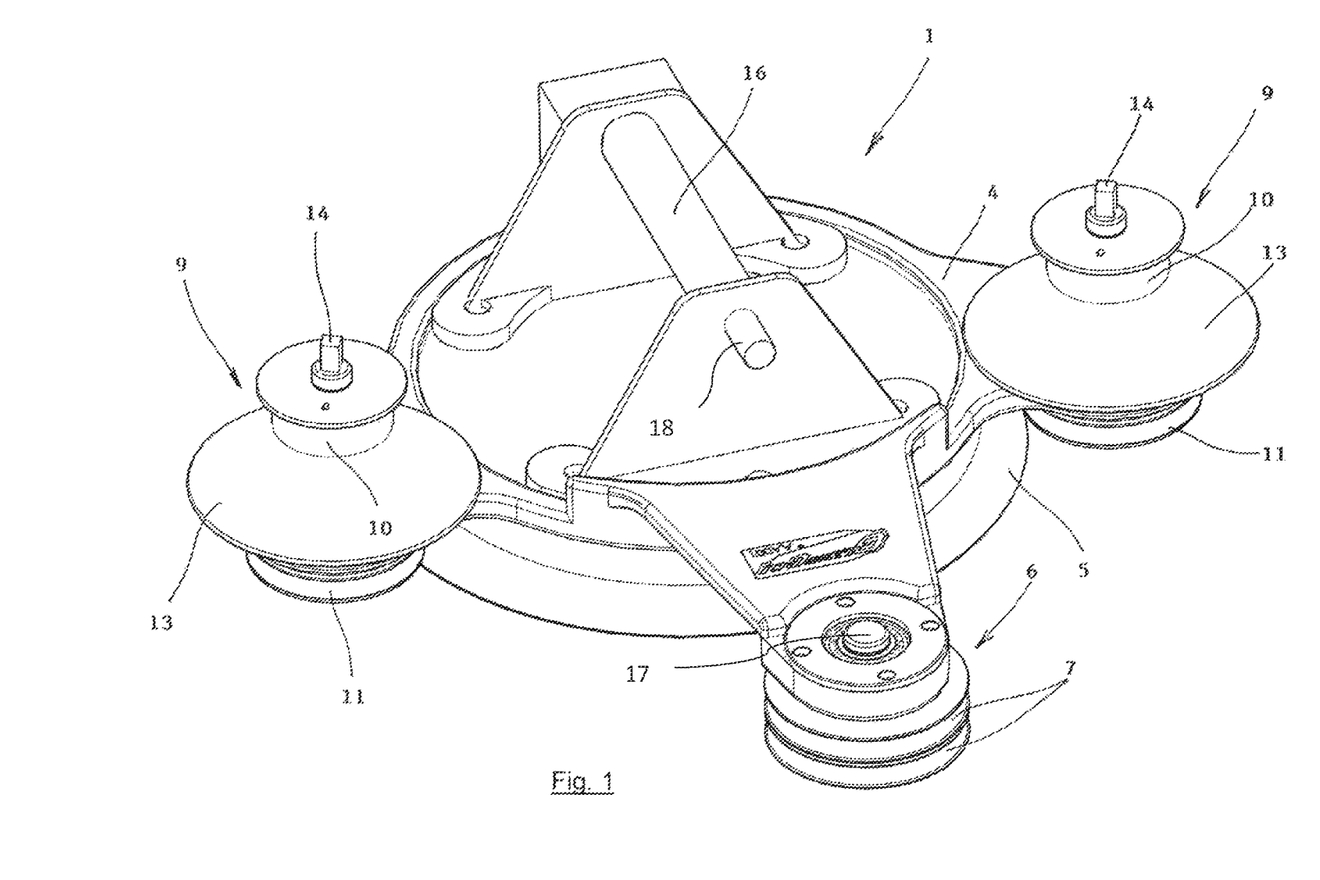

FIG. 1 provides a representation of a device 1 for releasing glasses 2 from vehicle bodies 3, in particular passenger vehicles. In this embodiment of the invention the device 1 is fitted with an aluminium frame 4 that is substantially planar. FIG. 1 shows that the shape of the frame 4 is circular with three projections. Under the circular area of the frame 4 one rubber or silicone suction pad 5 with a circular section plan is fastened and the frame 4 includes pressurizing channels for creating or removing vacuum in the space under the suction pad 5. Above the circular area of the frame 4 a handle 16 with an integrated pump and a control valve to control vacuum under the suction pad 5 is installed. Above two opposite projections of the frame 4 winding pulleys 9 are arranged and under the remaining third projection a double guide pulley 6 is provided.

In other embodiments of the invention which are not provided in the illustrations the device 1 can be fitted with a suction pad 5 with a different section plan (e.g. ellipse), or size, or directly with more suction pads 5, however a single circular suction pad 5 shows the best results in terms of the stability of the device 1 fastening on the glass 2.

Figure 4A:
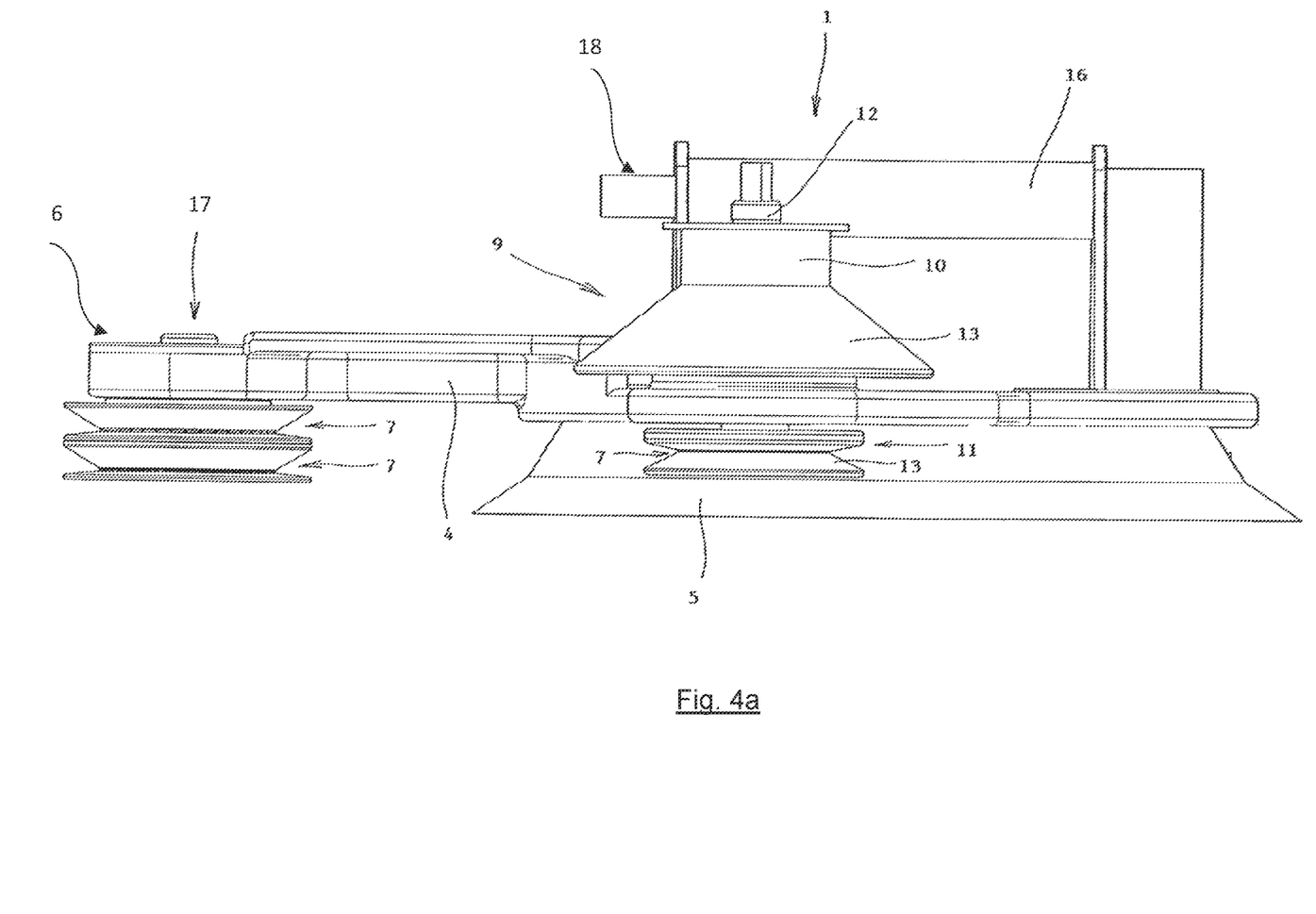
Figure 4B:
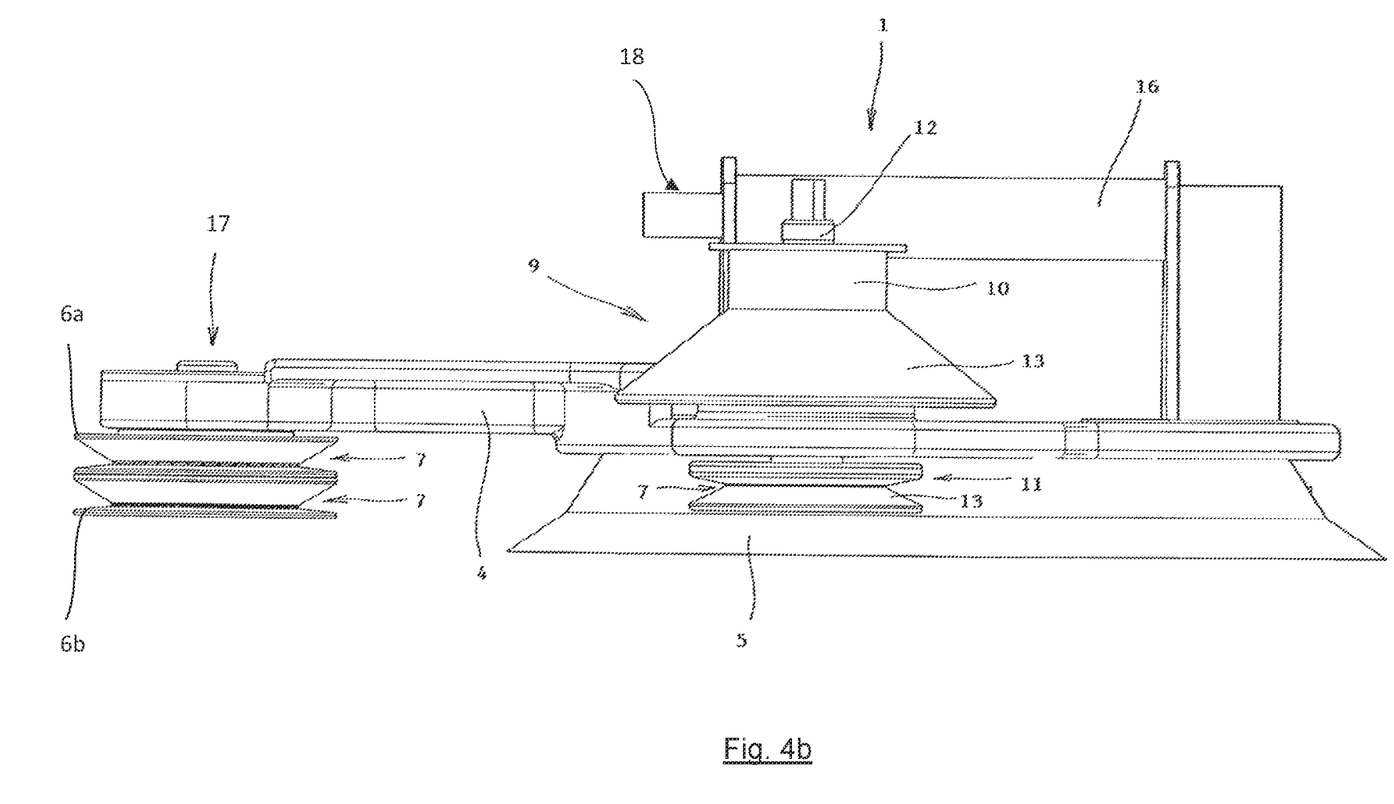

The double guide pulley 6, in one embodiment shown in FIG. 4b, consists of two guide pulleys 6a, 6b, where each guide pulley 6a, 6b has its designated guide groove 7 to guide a cutting wire 8. The guide pulleys 6a, 6b have a common steel shaft collinear with the common central line of the guide pulleys 6a, 6b. The rings with guide grooves 7 of the guide pulleys 6a, 6b are made of aluminium, steel or durable plastic material. Each guide pulley 6a, 6b can rotate freely in both directions. In another embodiment of the invention that is shown in FIG. 4a, the guide pulley 6 is fitted with two guide grooves 7, in which the cutting wire 8 slips during winding.

The winding pulley 9 provided in FIG. 1 is fitted with a spacing pulley 11 with a designated guide groove 7 under the winding pulley's frame 4. The winding pulley 9 and the spacing pulley 11 share the same shaft 12 collinear with the central line. An adapter 14 for fitting on a socket spanner, crank handle or electric motor protrudes from the shaft 12. The winding pulley 9, or where applicable also the spacing pulley 11, are equipped with a single-thrust bearing allowing rotation in one direction only. The winding groove 10 has an enlarged cone-shaped leading edge 13 and the winding pulley 9 can be detachable by removing or fitting on the shaft 12. The winding pulley 9 and the spacing pulley 11 are made of materials similar to those of which the guide pulley 6 is made of. In an embodiment of the invention that is not provided in the illustrations the winding pulley 9 can be fitted with a spacing element, such as a fixed metal pin with grooves preventing the cutting wire 8 slipping.

Figure 2:
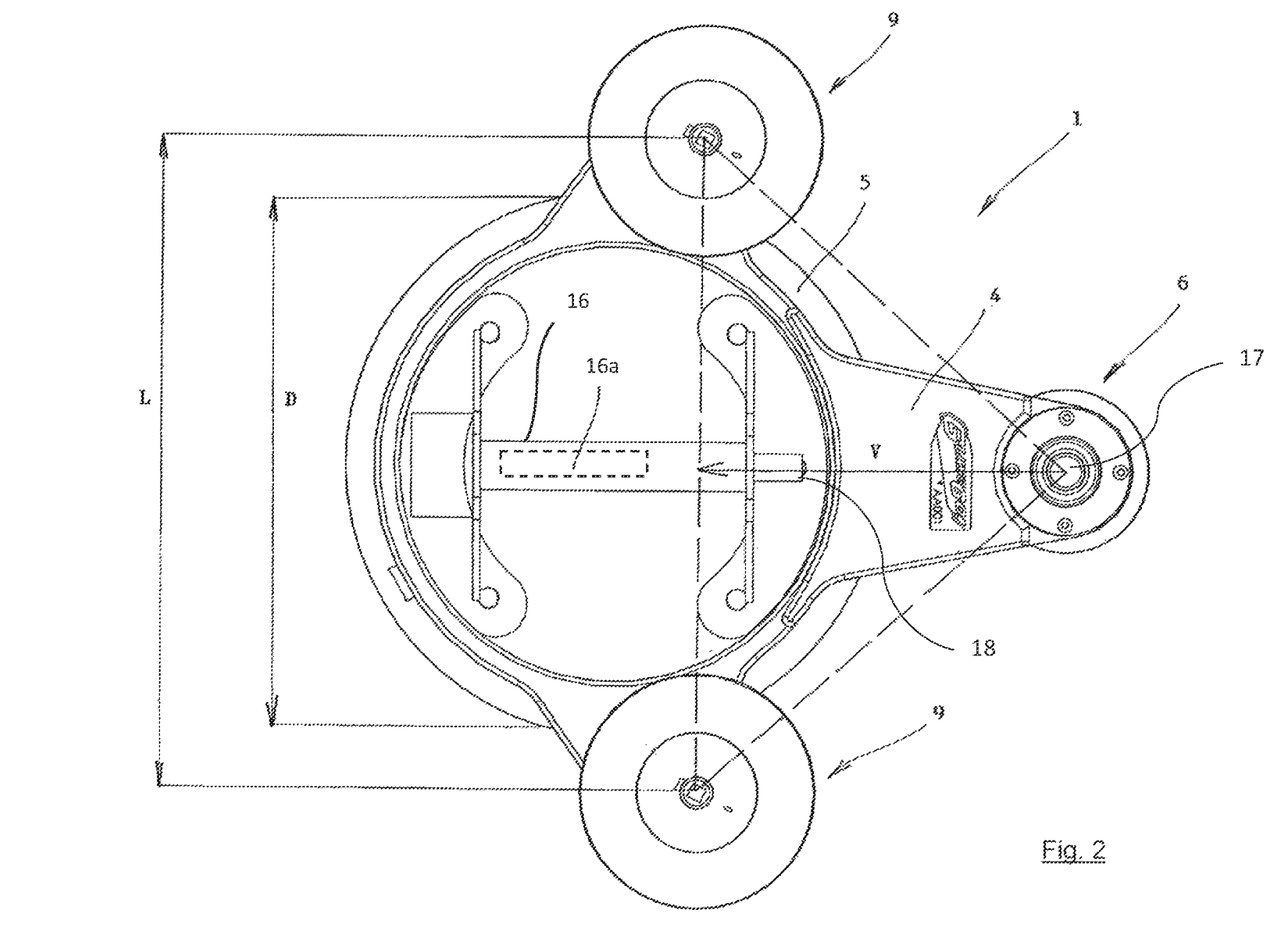

FIG. 2 provides a plan view of the device 1. The circle circumscribed on a single suction pad 5 with a circular section plan coincides with the circumference of the suction pad 5. The diameter D of the circumscribed circle and the diameter of the suction pad 5 are identical. The shown distance L between the central lines of the winding pulleys 9 of the device 1 is greater than the diameter D of the circumscribed circle. To make the spacing elements or spacing pulleys 11 protect the suction pad 5 against the cutting wire 8 upon releasing the glass 2 with large dimensions compared to the size of the device 1, the distance L and the diameter D of the circumscribed circle can be identical in the extreme. FIG. 2 shows a triangle whose one apex is positioned on the central line of the guide pulley 6 and the height V of the triangle from the side of the triangle situated between the central lines of the winding pulleys 9 is greater or equals the value of the diameter D of the circle circumscribed on the suction pad 5.

Figure 3:
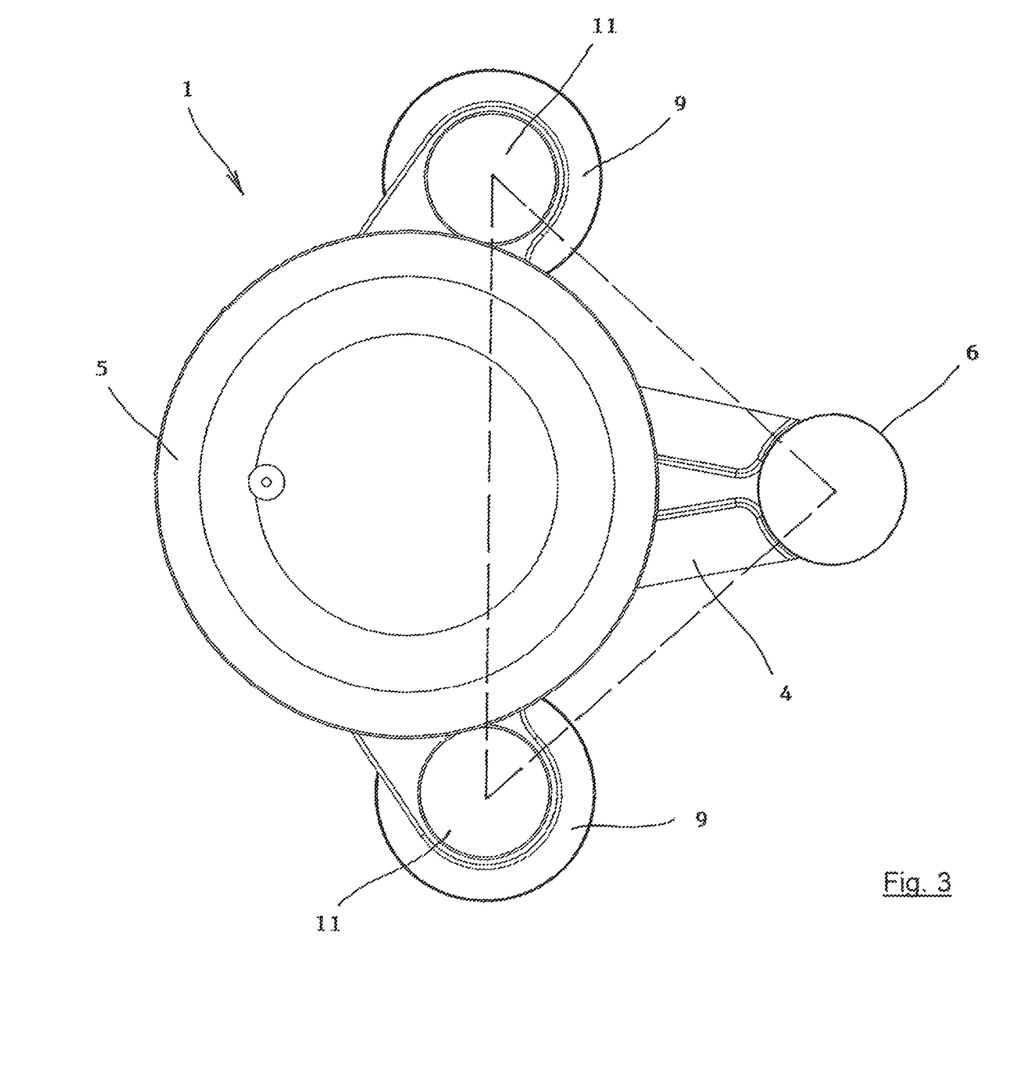

FIG. 3 provides a bottom view of the device 1. FIG. 3 shows that the size of the spacing pulleys 11 is smaller than that of the winding pulleys 6 fitted with a cone-shaped leading edge 13.

The device 1 shown in the side view is provided in FIG. 4. The guide grooves 7 and the winding groove 10 are fitted with the cone-shaped leading edge 13 allowing a more stable guiding or more precise winding of the cutting edge 8.

Figure 5:
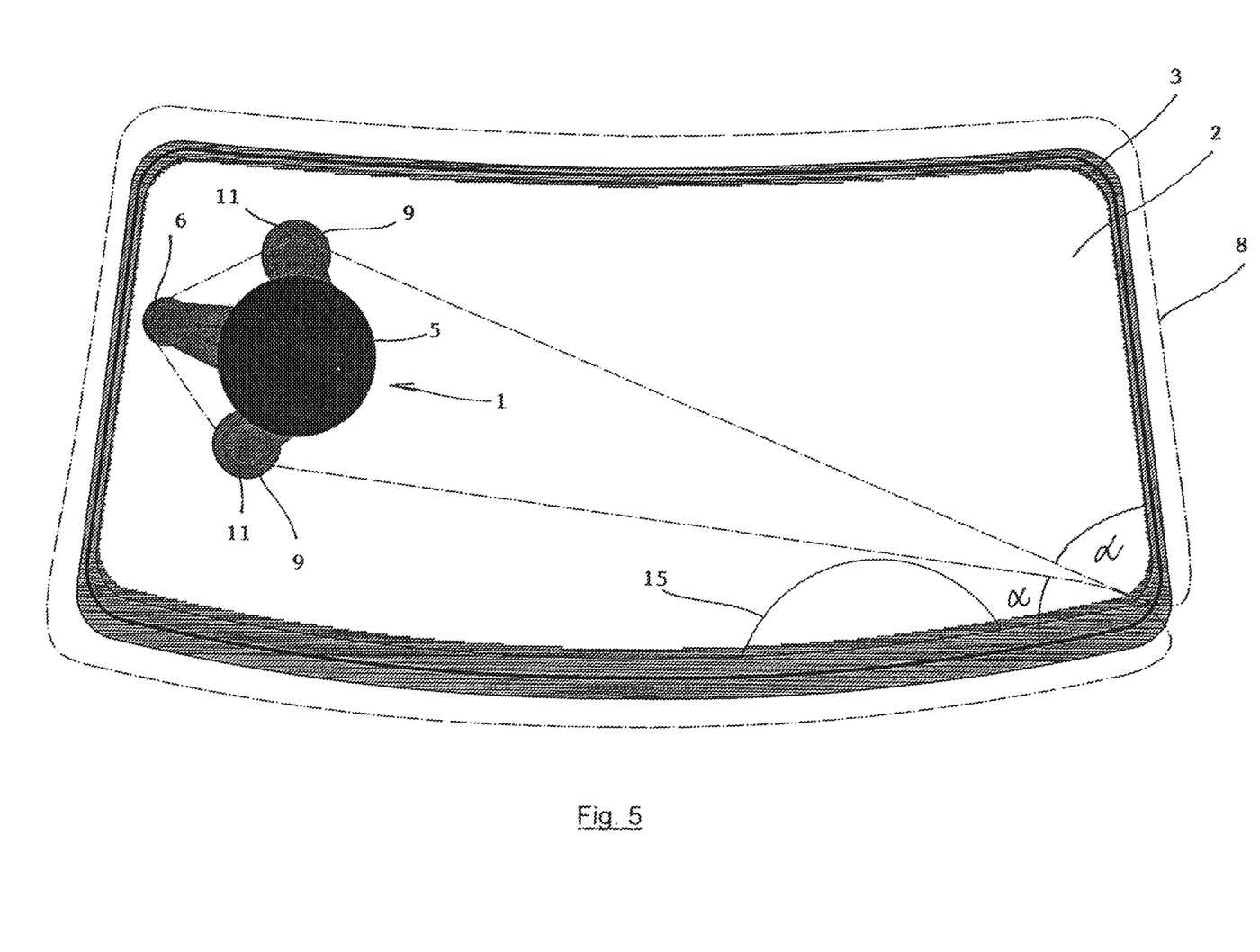

FIG. 5 shows the glass 2 fixed in the body 3 of the vehicle. This is a view from the outside of the windscreen glass 2 of the vehicle as indicated by the shown steering wheel 15. The device 1 is fastened to the glass 2 on the inner side. The glass 2 is fastened to the vehicle body 3 using a layer of binding agent that will be slit by the cutting wire 8 along the circumference of the glass 2 for its releasing.

As shown in FIG. 5, the device 1 is in the position one, which means that it has been fastened in the corner area of the glass 2 with the guide pulley 6 facing the vertical side of the glass 2 and the winding pulleys 9 facing the horizontal sides of the glass 2. The cutting wire 8 is arranged along the glass 2 circumference from the outside and the free ends of the cutting wire 8 have been run through the binding agent layer to make it possible to fasten them to the device 1. The free ends of the cutting wire 8 are led in front of the spacing pulleys 11 and onto the guide pulleys 6 from where they return to the winding pulleys 9 where they are fixed to the winding grooves 10. In the position one the cutting wire 8 and the edge of the glass 2 form an acute cutting angle $\alpha$. The spacing pulleys 11 in the position one protect the suction pad 5 against cutting by the cutting wire 8.

Figure 6:
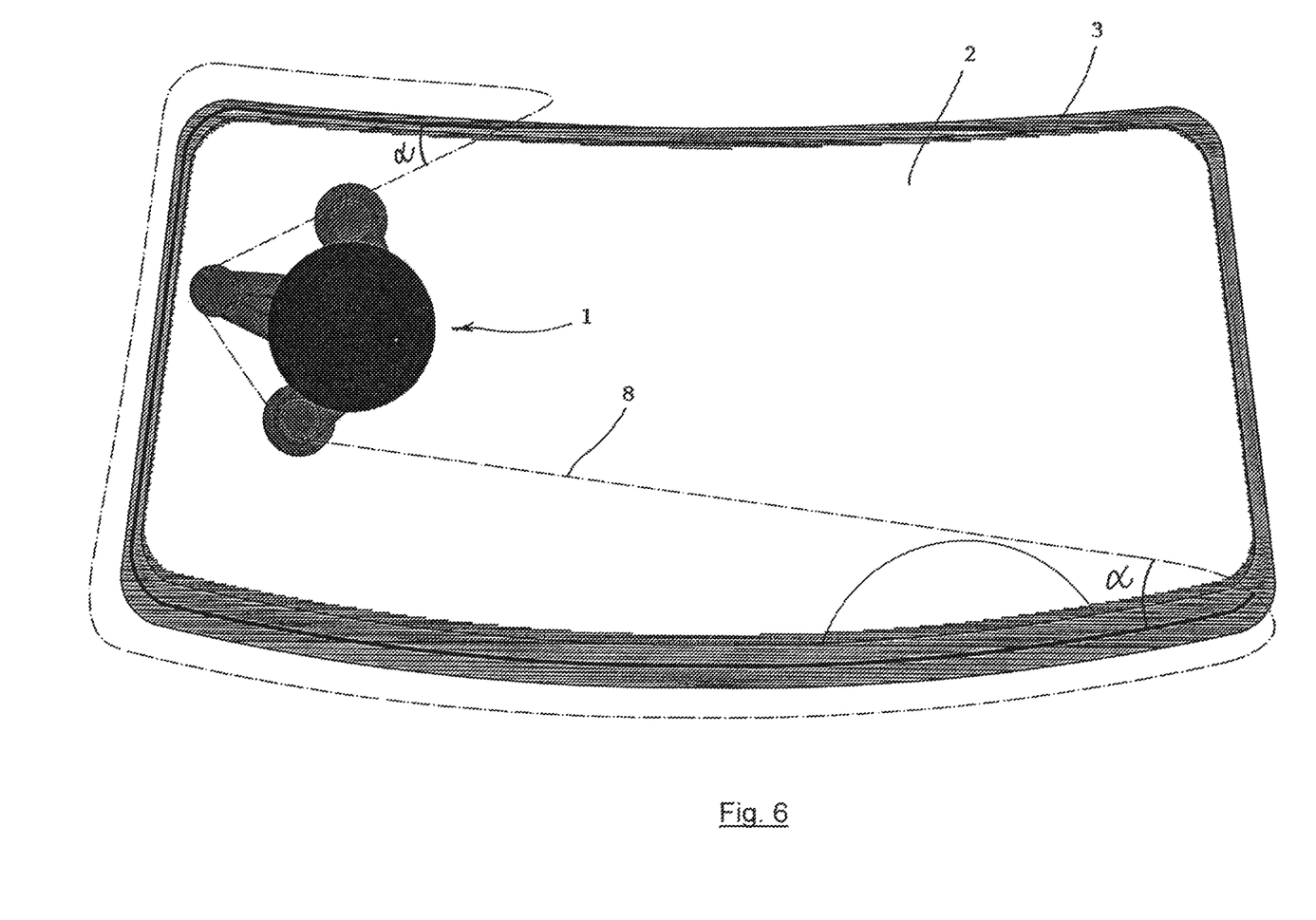

FIG. 6 shows the second position of the device 1 during releasing the glass 2 at which the cutting wire 8 is wound onto one of the winding pulleys 9. As the cutting wire 8 gets shorter, it cuts through the binding agent layer and the cutting wire 8 keeps the acute cutting angle $\alpha$. In the position two one of the spacing pulleys 11 becomes insignificant.

Figure 7:
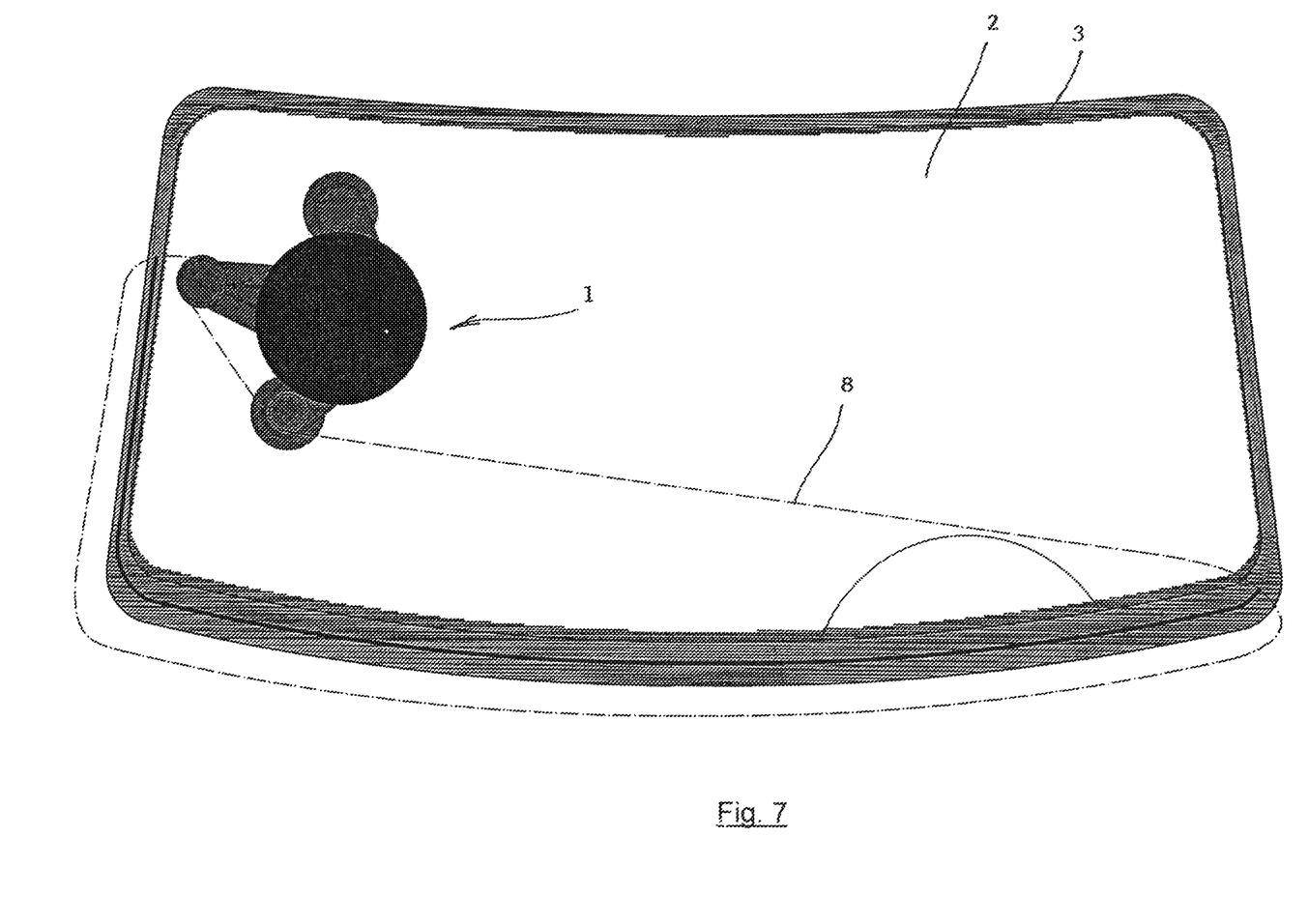

FIG. 7 shows the third position of the device 1 during releasing the glass 2. In this position one half of the cutting wire 8 has been already wound onto the winding pulley 9 and a half of the glass 2 has been released. In the third position the cutting wire 8 starts winding onto the other winding pulley 9.

Figure 8:
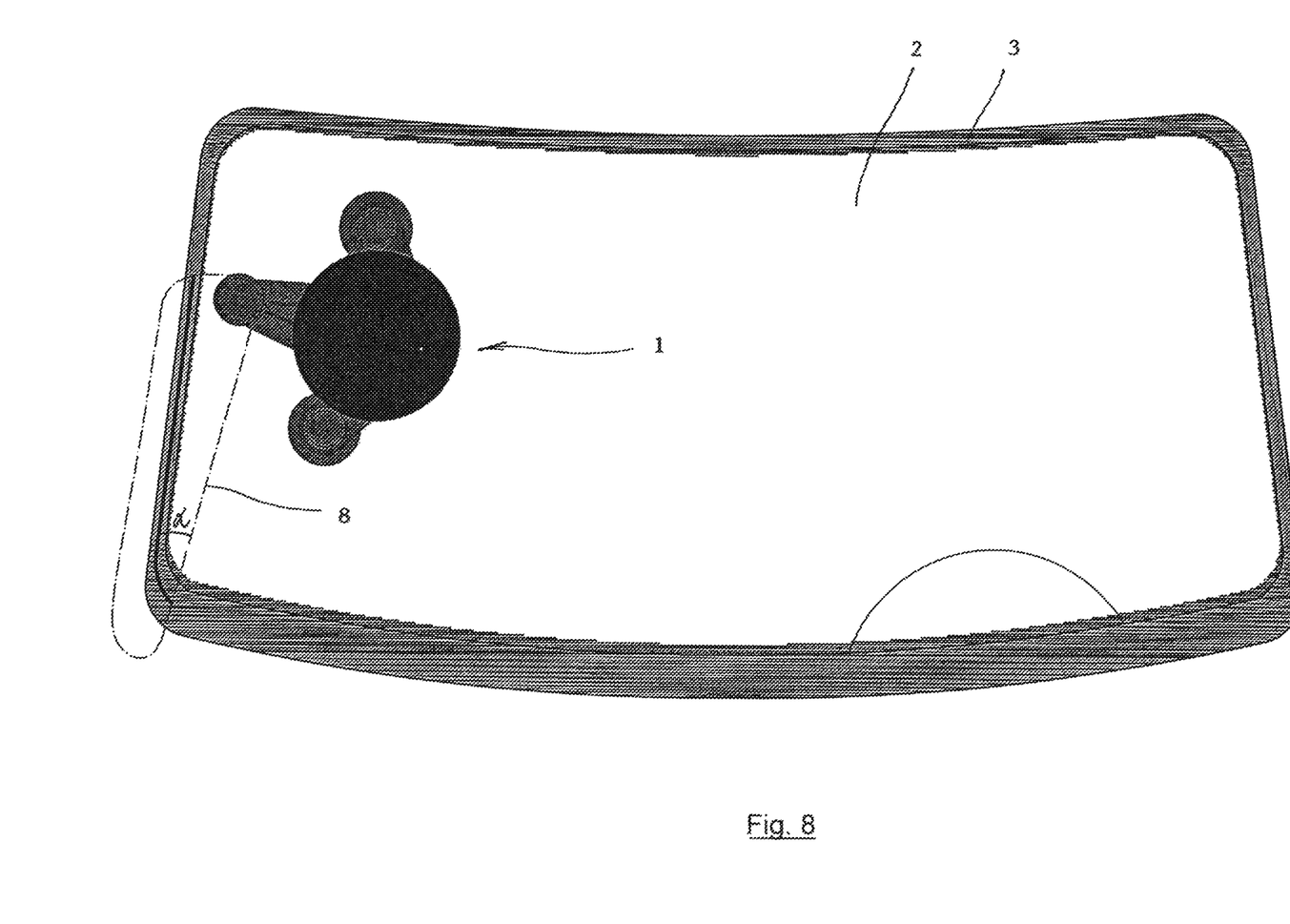

FIG. 8 shows the device 1 in the fourth operating position when also the other spacing pulley 11 becomes insignificant. The cutting angle α has approached the value of 90°, which is however not exceeded and it is not necessary to move the device 1 or interfere in the course of cutting in any manner.

Figure 9:
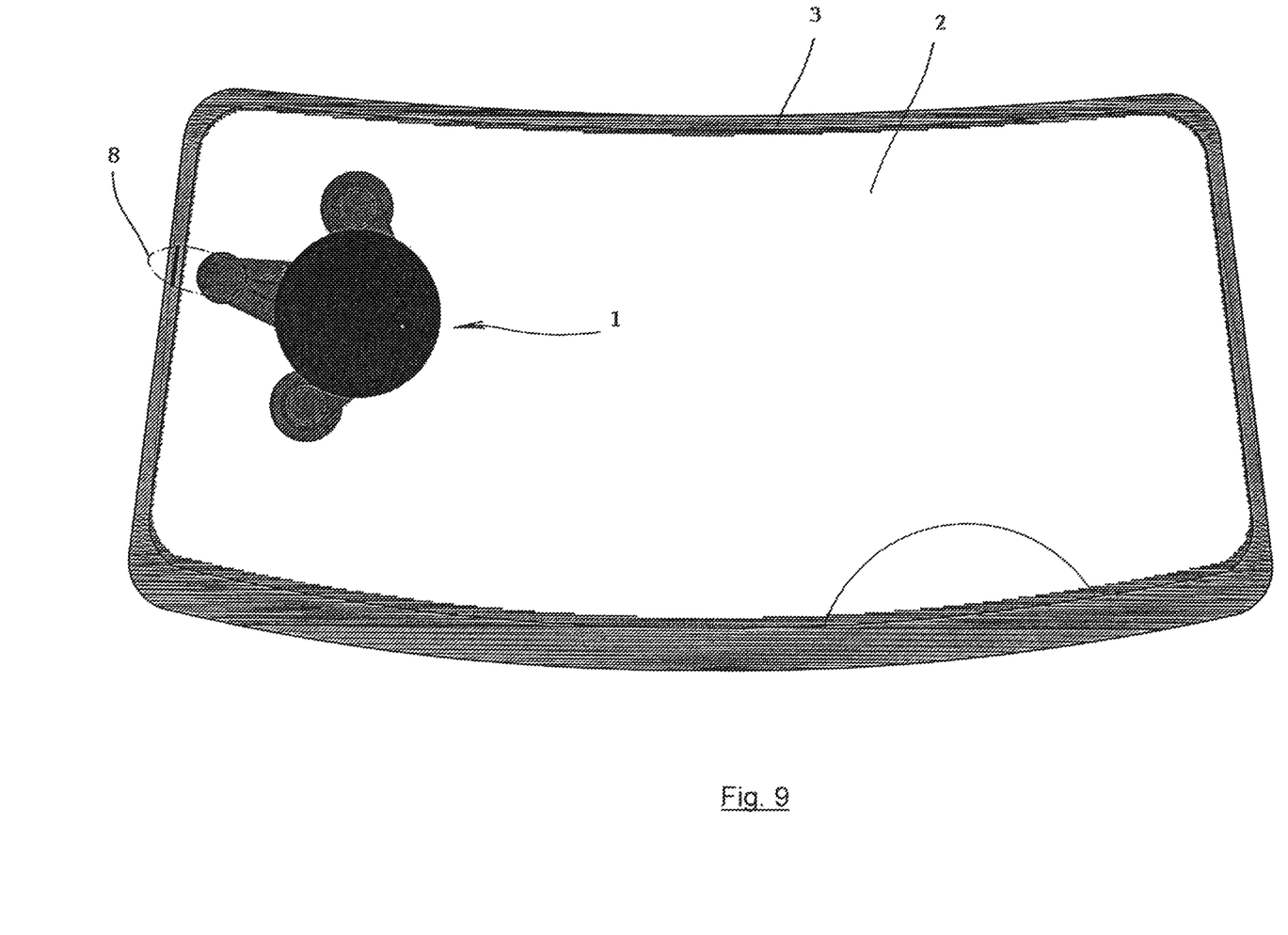

FIG. 9 shows the fifth position of the device 1 prior to finishing the binding agent layer cutting. Due to the loop winding of the cutting wire 8 via the guide pulleys 6 a loop of the cutting wire 8 providing complete releasing of the glass 2 is pulling around the binding agent layer in the last sections of the cut.

Figure 10:
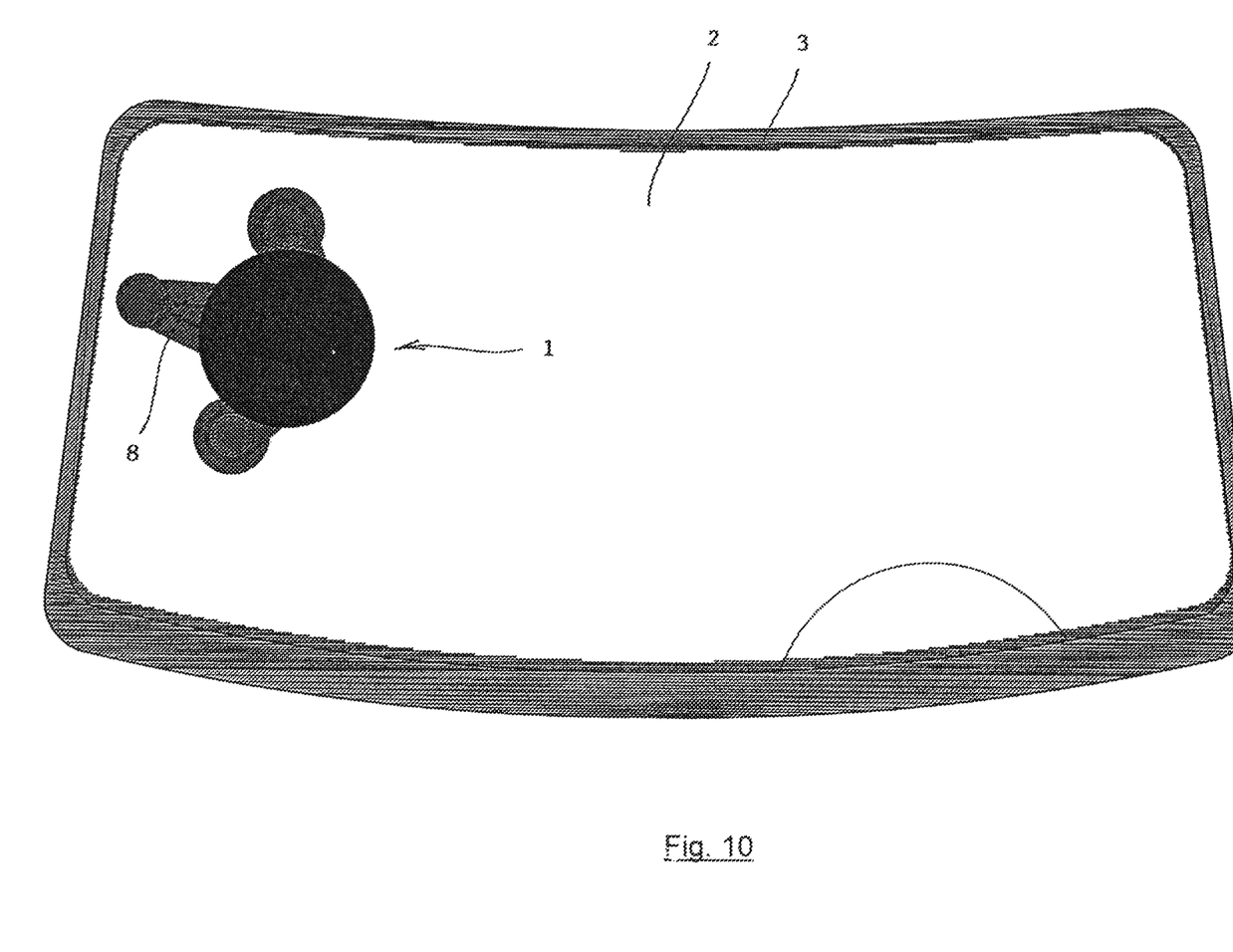

FIG. 10 shows the last position, i.e. the sixth one, where the glass 2 has been fully released from the vehicle body 3 and the device 1 can be removed and prepared for further operation. The cutting wire 8 has been wound up on the winding pulleys 9 and the cutting wire 8 is rewound via the double guide pulley 6 in a loop.

INDUSTRIAL APPLICABILITY

The device for releasing glasses from vehicle bodies and the method of releasing glasses according to the invention can be employed in the automotive industry, in particular in the field of damaged glass servicing.

OVERVIEW OF THE POSITIONS USED IN THE DRAWINGS 1 device for releasing glasses from vehicle bodies
2 vehicle glass
3 vehicle body
4 frame
5 suction pad
6 guide pulley
7 guide groove
8 cutting wire
9 winding pulley
10 winding groove
11 spacing pulley
12 shaft
13 cone-shaped leading edge
14 adapter
15 steering wheel
16 handle
L centre-to-centre distance of winding pulleys
D diameter of the circle circumscribed on the suction pad
V height of the triangle between the side of the L length and the guide pulley central line
α cutting angle

The invention claimed is:

1. A device (1) for releasing glasses (2) from the bodies (3) of vehicles comprising:
    a frame (4) fitted with at least one suction pad (5) for detachable fastening to the glass (2) being released,
    at least one guide pulley (6) equipped with at least one guide groove (7) to guide a cutting wire (8),
    at least one winding pulley (9) fitted with at least one winding groove (10) to wind the cutting wire (8),
    wherein the frame (4) is fitted with two winding pulleys (9) and the at least one guide pulley (6),
    wherein the at least one guide pulley (6) comprises a common central line (17) and either (i) one guide pulley (6) equipped with two guide grooves (7) or (ii) two guide pulleys (6a, 6b) each with one guide groove (7),
    wherein the pulleys (6, 9) are arranged on the frame (4) in a manner that their central lines intersect the apices of a triangle, and
    wherein a distance (L) between the central lines of the winding pulleys (9) is greater or equals a diameter (D) of the circle circumscribed on the projection of the suction pad (5), and the value of the altitude (V) of the triangle from the apex intersected by the central line of the guide pulley (6) is greater or equals a diameter (D) of the circle circumscribed on a projection of the suction pad (5), and
    the winding pulleys (9) are fitted with at least one spacing element for guiding the cutting wire (8) outside the suction pad (5).

2. The device according to claim 1, wherein the spacing element for guiding the cutting wire (8) of the winding pulley (9) comprises a spacing pulley (11) fitted with a guide groove (7), wherein the winding pulley (9) and the spacing pulley (11) have a common shaft (12).

3. The device according to claim 1, wherein the winding pulleys (9) and/or spacing pulleys (11) are fitted with a single-thrust bearing.

4. The device according to claim 1, wherein the guide grooves (7) and/or winding grooves (10) are fitted with a cone-shaped leading edge (13) on one side for a cutting wire (8).

5. The device according to claim 1, wherein the winding pulleys (9) are fitted with an adapter (14) for mounting a socket wrench, crank handle or electric motor.

6. The device according to claim 1, wherein the frame (4) is equipped with a handle (16).

7. The device according to claim 6, wherein that handle (16) includes an integrated pump (16a) connected to the suction pad (5) and/or a control valve (18) connected to the suction pad (5) to control the vacuum.

8. The device according to claim 7, wherein the frame (4) is substantially planar with top and bottom sides, wherein the suction pads (5), guide pulley (6), and the spacing element are arranged at the bottom side of the frame (4), whereas the winding pulleys (9) and handle (16) are arranged at the top side of the frame (4).

9. The method of releasing glasses (2) from the bodies (3) of vehicles using the device (1) designed according to claim 1 wherein the device (1) includes at least one suction pad (5), guide pulley (6) fitted with two guide grooves (7) to guide the cutting wire (8) or two guide pulleys (6) with a designated guide groove (7) and a common central line, two winding pulleys (9) equipped with winding grooves (10) for winding the cutting wire (8), and a spacing element or a spacing pulley (11), the method comprising:
    a) fastening the device (1) to the glass (2) using the suction pad (5),
    b) arranging the cutting wire (8) along the circumference of the glass (2) on the side that is opposite to the side on which the device (1) has been fastened and pulling through the cutting wire (8) free ends between the glass (2) and the body (3) of the vehicle to the side of the glass (2) with the fastened device (1),
    c) fastening the free ends of the cutting wire (8) to the winding pulleys (9) wherein each end of the cutting wire (8) is led around the spacing elements or in the guide grooves (7) of the spacing pulleys (11) and then each end of the cutting wire (8) is led in a designated guide groove (7) of the guide pulley (6) and the free ends of the cutting wire (8) are fastened into the winding grooves (10) of the winding pulleys (9), d) winding the cutting wire (8) onto the winding pulleys (9) either successively or simultaneously until complete winding up the cutting wire (8) onto the winding pulleys (9) whereby the cutting wire (8) is cutting through between the glass (2) and the vehicle body (3), e) removing the device (1) from the released glass (2).

\* \* \* \* \*